Jan. 12, 1965 G. A. SHACKNOW 3,165,704
PHASE DISCRIMINATOR
Filed Oct. 26, 1961
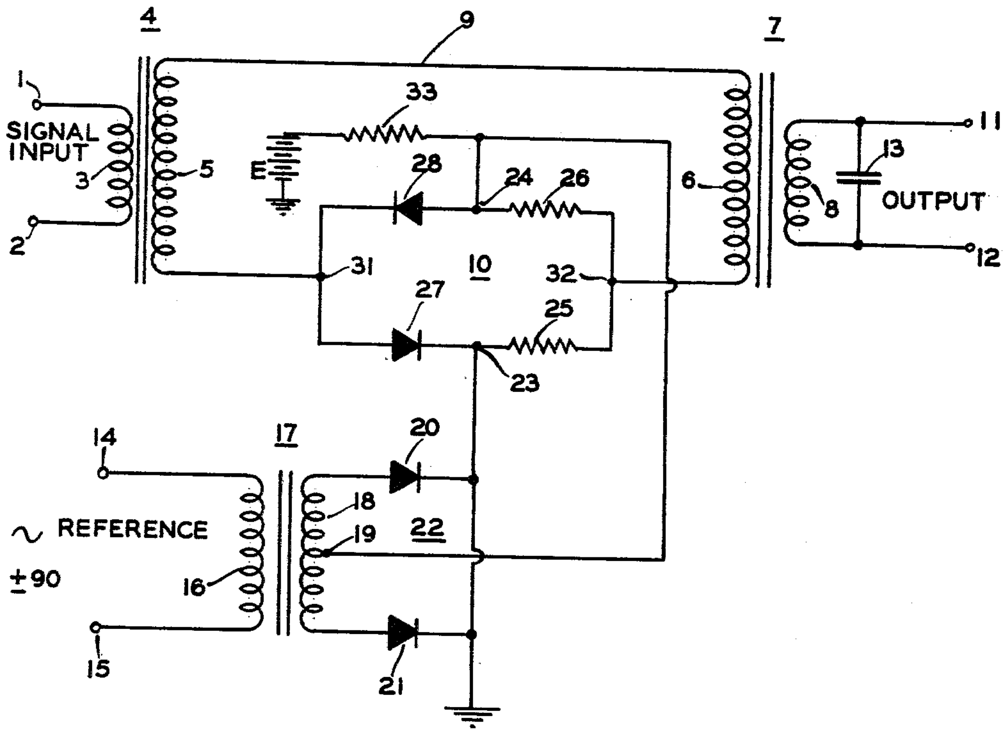
INVENTOR.
GEORGE A. SHACKNOW
BY
Marvin Snyder
Agent United States Patent Office 3,165,704

Patented Jan. 12, 1965

3,165,704

PHASE DISCRIMINATOR

George A. Shacknow, Bronx, N.Y., assignor to The Bendix Corporation, Teterboro, N.J., a corporation of Delaware Filed Oct. 26, 1961, Ser. No. 147,975
14 Claims. (Cl. 328—166)

This invention relates to discriminators, and more particularly to discriminating means for rejecting quadrature signals.

In most alternating current servo systems such as are commonly found in autopilot circuits, quadrature signals, that is, signals which are 90° out-of-phase with the desired signal, represent undesired noise signals. To eliminate such undesired signals, quadrature rejection circuits which block the quadrature signals are used.

In the past, quadrature rejection circuits required complex circuitry, and were large in size and low in efficiency. In addition, most quadrature rejection circuits employed at least one active element.

Accordingly, it is an object of this invention to provide a quadrature rejection circuit which passes low level in-phase signals and rejects high level quadrature signals.

Another object of this invention is to provide a quadrature rejection circuit simple in design, small in size, and light in weight.

Another object of this invention is to provide a rugged quadrature rejection circuit which is reliable and efficient.

Another object of this invention is to provide a quadrature rejection circuit made up of passive circuit elements only.

The invention contemplates a phase discriminator for discriminating against quadrature signals comprising an input adapted to receive a signal having a desired in-phase component and an unwanted quadrature component, an output, a quadrature rejection network connected between the input and the output and including switching means rendered conducting when the desired in-phase component is a maximum and the unwanted quadrature component is a minimum and rendered nonconducting when the unwanted quadrature component is a maximum and the desired in-phase component is a minimum.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustraton purposes only and is not to be construed as defining the limits of the invention.

In the drawing, the single figure is a schematic diagram of a quadrature rejection circuit embodying the present invention.

Referring to the figure, an alternating signal comprising a desired in-phase component and an unwanted quadrature component is applied to the novel quadrature rejection circuit embodying the present invention across terminals 1 and 2 connected to the primary winding 3 of an input coupling transformer 4. Secondary winding 5 of transformer 4 is connected to the primary winding 6 of output coupling transformer 7 through lead 9 and quadrature rejection network 10. The quadrature free output signal appears across terminals 11 and 12 connected to secondary winding 8 of transformer 7. A capacitor 13 is connected across secondary winding 8 to tune the output to resonance at the desired frequency and reshape the output signal to sinusoidal form.

Network 10 comprises a pair of parallel circuits each having a bilateral conducting element, such as a resistor 25, 26, serially connected to a unilateral conducting element, such as a diode 27, 28. Diodes 27 and 28 are connected in the circuit to conduct in opposite directions. Network 10 is biased at point 24 between resistor 26 and diode 28 by a direct current potential E connected through a resistor 33 and by the pulsating direct current output of a full-wave rectifier 22 energized by an alternating current reference source 90° out-of-phase with the desired in-phase component and in phase with the quadrature component of the signal. Point 23 of network 10 between resistor 25 and diode 27 is connected to ground and to full-wave rectifier 22.

Full-wave rectifier 22 comprises a transformer 17 having a primary winding 16 connected to the reference source and a center-tapped secondary winding 18 having its center tap 19 connected to point 24 of network 10 and having its ends connected through diodes 20 and 21 to ground and to point 23 of network 10.

Network 10 functions as a switch which closes when the desired in-phase component is a maximum and the unwanted quadrature component is a minimum and opens when the unwanted quadrature component is a maximum and the desired in-phase component is a minimum. Diodes 27 and 28 are biased in a forward direction by direct current voltage E through resistor 33 and in a reverse direction by pulsating voltage from rectifier 22 90° out-of-phase with the desired component and in phase with the unwanted quadrature component.

When the instantaneous voltage across terminals 23 and 24 from rectifier 22 exceeds the direct current voltage E through resistor 33, terminal 24 is negative with respect to terminal 23 and diodes 27 and 28 are reverse biased, presenting a high impedance to the signal. When the instantaneous voltage across terminals 23 and 24 from rectifier 22 falls below the direct current voltage E through resistor 33, terminal 24 is positive with respect to terminal 23 and diodes 27 and 28 are forward biased, presenting a low impedance to the error signal. The size of resistor 33 and the amplitude of direct current potential E determines the amplitude of the instantaneous voltage required across terminals 23 and 24 from rectifier 22 at which diodes 27 and 28 are reverse biased to block the error signal.

When the desired component of the error signal is at maximum amplitude and the unwanted quadrature component of the signal is at minimum amplitude, diodes 27 and 28 are forward biased, presenting a low impedance to the input signal, which appears across output terminals 11 and 12. When the desired component of the error signal is at minimum amplitude and the unwanted quadrature component is at maximum amplitude, diodes 27 and 28 are reverse biased, presenting a high impedance to the input signal which is attenuated by network 10.

The quadrature rejection circuit described herein and constructed according to the invention passes low level in-phase signals and rejects high level quadrature signals. The circuit is simple in design, light in weight, small in size, reliable and efficient, and includes only passive circuit elements.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A phase discriminator for discriminating against quadrature signals, comprising an input adapted to receive a signal having a desired in-phase component and an unwanted quadrature component, an output, a circuit having two legs connecting the input to the output including a direct connection in one leg and a quadrature rejection network in the other leg including switching means rendered conducting when the desired in-phase component is a maximum and the unwanted quadrature component is a minimum and rendered nonconducting when the unwanted quadrature component is a maximum and the desired in-phase component is a minimum.

2. A phase discriminator as described in claim 1 in which the switching means includes diode means biased to conducting and nonconducting states.

3. A phase discriminator for discriminating against quadrature signals, comprising an input adapted to receive a signal having a desired in-phase component and an unwanted quadrature component, an output, a quadrature rejection network connected between the input and the output and including diode means, biasing means including a full-wave rectifier adapted to be energized from a reference source in phase with the quadrature component, the diode means being connected in series with one another to the biasing means and rendered conducting when the desired in-phase component is a maximum and the unwanted quadrature component is a minimum and nonconducting when the unwanted quadrature component is a maximum and the desired in-phase component is a minimum.

4. A phase discriminator for discriminating against quadrant signals, comprising an input adapted to receive a signal having a desired in-phase component and an unwanted quadrature component, an output, a quadrature rejection network connected between the input and the output and including diode means, biasing means including a direct current voltage and a unidirectional pulsating voltage in phase with the quadrature component, the diode means being connected oppositely facing in series with one another to the biasing means and rendered conducting when the desired in-phase component is a maximum and the unwanted quadrature component is a minimum and nonconducting when the unwanted quadrature component is a maximum and the desired in-phase component is a minimum.

5. A phase discriminator for discriminaing against quadrature signals, comprising an input adapted to receive a signal having a desired in-phase component and an unwanted quadrature component, an output, a quadrature rejection network connected between the input and the output and including diode means, biasing means including a unidirectional pulsating voltage in phase with the quadrature component, the diode means being connected in series with one another to the biasing means and rendered conducting when the desired in-phase component is a maximum and the unwanted quadrature component is a minimum and nonconducting when the unwanted quadrature component is a maximum and the desired in-phase component is a minimum.

6. A phase discriminator for discriminating against quadrature signals, comprising an input adapted to receive a signal having a desired in-phase component and an unwanted quadrature component, an output, a circuit including two legs connecting the input to the output and including a direct connection in one leg and a quadrature rejection network connected in the other leg and including diode means, biasing means including a fixed direct current potential biasing the diodes in a forward direction and a pulsating direct current voltage in phase with the quadrature component and biasing the diode means in a reverse direction, the diode means being connected oppositely facing in series with one another to the biasing means and rendered conducting when the desired in-phase component is a maximum and the unwanted quadrature component is a minimum and nonconducting when the unwanted quadrature component is a maximum and the desired in-phase component is a minimum.

7. A phase discriminator for passing desired in-phase signals and discriminating against unwanted quadrature signals, comprising an input adapted to receive a signal having a desired in-phase component and an unwanted quadrature component, an output, a circuit having two legs connecting the input to the output and including a direct connection in one leg, and a quadrature rejection network in the other leg and including means for changing the impedance between the input and the output by providing a low impedance when the unwanted quadrature signal is a minimum and the desired in-phase signal is a maximum and a high impedance when the unwanted quadrature signal is a maximum and the desired in-phase signal is a minimum.

8. A phase discriminator as described in claim 7 in which the impedance changing means includes diode means biased to conducting and nonconducting states.

9. A phase discriminator for discriminating against undesired quadrature signals, comprising an input adapted to receive a signal having a desired in-phase component and an unwanted quadrature component, an output, a quadrature rejection network connected between the input and the output and including unilateral conducting means connected in series with one another to biasing means for rendering the unilateral conducting means conducting when the desired in-phase component is a maximum and the unwanted quadrature component is a minimum and for rendering the unilateral conducting means nonconducting when the unwanted quadrature component is a maximum and the desired in-phase component is a minimum.

10. A phase discriminator as described in claim 9 in which the unilateral conducting means includes diode means biased to conducting and nonconducting states.

11. A phase discriminator for discriminating against quadrature signals comprising an input adapted to receive a signal having a desired in-phase component and an unwanted quadrature component, an output, a circuit including two legs connecting the input to the output and including a direct connection in one leg and a quadrature rejection network in the other leg and including a pair of parallel circuits each having a unilateral conducting element, and biasing means connected in series with the unilateral conducting elements for rendering the elements conducting when the desired in-phase component is a maximum and the unwanted quadrature component is a minimum and for rendering the elements nonconducting when the unwanted quadrature component is a maximum and the desired in-phase component is a minimum.

12. A phase discriminator as described in claim 11 in which the unilateral conducting elements are diodes.

13. A phase discriminator for discriminating against quadrature signals, comprising an input adapted to receive a signal having a desired in-phase component and an unwanted quadrature component, an output, a circuit having two legs connecting the input to the output and including a direct connection in one leg and a quadrature rejection network in the other leg and including a pair of parallel circuits each having a diode and a resistor, and biasing means connected in series with parallel circuits one of which includes the diodes in series and the other of which includes the resistors in series for rendering the diodes conducting when the desired in-phase component is a maximum and the unwanted quadrature component is a minimum and for rendering the diodes nonconducting when the unwanted quadrature component is a maximum and the desired in-phase component is a minimum.

14. A phase discriminator as described in claim 13 in which the biasing means includes a full-wave rectifier energized from a reference source 90° out-of-phase with the in-phase signal component.

References Cited in the file of this patent

UNITED STATES PATENTS 3,030,522 Fennick ---------------- Apr. 17, 1962